United States Patent
Ohkawa

(10) Patent No.: US 6,280,043 B1
(45) Date of Patent: Aug. 28, 2001

(54) SURFACE LIGHT SOURCE DEVICE OF SIDE LIGHT TYPE

(75) Inventor: Shingo Ohkawa, Koshigaya (JP)

(73) Assignees: Enplas Corporation, Kawaguchi; Yasuhiro Koiki, Yokohama, both of (JP)

( * ) Notice: Subject to any disclaimer, the term of this patent is extended or adjusted under 35 U.S.C. 154(b) by 0 days.

(21) Appl. No.: 09/072,983

(22) Filed: May 6, 1998

(30) Foreign Application Priority Data

May 14, 1997 (JP) ...................................... 9-139332

(51) Int. Cl.$^7$ ...................................................... F21V 7/04
(52) U.S. Cl. ................................ 362/31; 362/26; 349/65
(58) Field of Search ............................... 362/31, 26, 330, 362/339; 349/65

(56) References Cited

U.S. PATENT DOCUMENTS

| | | | |
|---|---|---|---|
| 5,718,497 | * | 2/1998 | Yokoyama ............................... 362/31 |
| 5,735,590 | * | 4/1998 | Kashima ................................ 362/31 |
| 5,779,338 | * | 7/1998 | Ishikawa ................................ 362/31 |
| 5,818,555 | | 10/1998 | Yokoyama et al. . |
| 5,890,791 | * | 4/1999 | Saito ...................................... 362/31 |
| 5,997,148 | * | 12/1999 | Ohkawa ................................. 362/31 |
| 5,999,685 | * | 12/1999 | Goto ..................................... 385/146 |
| 6,027,222 | * | 2/2000 | Oki ....................................... 362/31 |
| 6,086,211 | * | 7/2000 | Ohkawa ................................. 362/31 |
| 6,155,692 | * | 12/2000 | Ohkawa ................................. 362/31 |
| 6,164,790 | * | 12/2000 | Lee ....................................... 362/31 |

FOREIGN PATENT DOCUMENTS

| | | |
|---|---|---|
| 308649 | 6/1997 | (CN) . |
| 331593 | 5/1998 | (CN) . |
| 9-304625 | 1/1997 | (JP) . |
| 9-318818 | 2/1997 | (JP) . |
| 10-39144 | 2/1998 | (JP) . |

\* cited by examiner

*Primary Examiner*—Cassandra Spyrou
*Assistant Examiner*—Leo Boutsikaris
(74) *Attorney, Agent, or Firm*—Staas & Halsey LLP

(57) ABSTRACT

A surface light source device of side light type has a scattering guide plate, a primary light source, a reflection sheet and a prism sheet. An emission surface of the guide plate provides a light control surface. The light control surface has many fine projections approximately perpendicular to an incidence surface or inclined by a small angle with respect to the incidence surface. In each of the projections, dullness varying in accordance with position on the emission surface is given to a slope-couple including a pair of slopes produce a uniform emitting intensity from the emission surface. A back surface of the guide plate may provide a light control surface so that dullness varying in accordance with position is given to slope-couples.

13 Claims, 13 Drawing Sheets

SURFACE LIGHT SOURCE DEVICE OF SIDE LIGHT TYPE

BACKGROUND OF THE INVENTION

1. Field of the Invention

The present invention relates to a surface light source device of side light type and more particularly relates to a surface light source device of side light type in which uniformity of luminance is improved. The present invention is applied, for example, to backlighting for a liquid crystal display.

2. Related Art

A surface light source device of side light type is conventionally applied to a liquid crystal display to illuminate a liquid crystal panel from its back surface. This arrangement is suitable for making an entire shape of the surface light source device thin.

A bar-shaped light source such as a cold cathode tube, etc. is generally adopted as a primary light source in the surface light source device of side light type and is arranged on the side of a guide plate (a guide material formed in a plate shape). Illuminating light emitted from the primary light source is introduced into the guide plate through a side end surface (incidence surface) of the guide plate. The introduced illuminating light is propagated within the guide plate and light is emitted from a major surface of the guide plate toward the liquid crystal panel during this propagation.

It is known that the guide plate adopted in the surface light source device of side light type is of a type having a substantially uniform plate thickness and a type having a tendency to reduce in thickness corresponding to the distance from the primary light source. In general, the latter efficiently emits illuminating light in comparison with the former.

FIG. 12 is an exploded perspective view showing a conventional surface light source device of side light type using the guide plate of the latter type. FIG. 13 shows a cross section taken along line A—A of FIG. 12. With reference to FIGS. 12 and 13, the surface light source device 1 of side light type has a guide plate 2, a primary light source 3, a reflection sheet 4 and a prism sheet 5 serving as a light control member. The reflection sheet 4, the guide plate 2 and the prism sheet 5 are laminatedly arranged. The primary light source 3 is arranged on a side of the guide plate 2.

The guide plate 2 is made of a scattering guide material having a wedge-shaped cross section and is called a scattering guide plate. For example, the scattering guide material is made of a matrix formed of PMMA (polymethyl methacrylate) and many transmissive fine particles uniformly dispersed into the matrix. Refractive index of these fine particles is different from that of the matrix.

The primary light source 3 has a cold cathode tube (fluorescent lamp) 7 and a reflector 8 having a nearly semicircular shape in cross section and backing the cold cathode tube 7. Illuminating light is supplied to an incidence surface 2A as a side end surface of the scattering guide plate 2 through an opening of the reflector 8. A sheet-like regular reflection member made of a metallic foil, etc., or a sheet-like irregular reflection member made of a white PET film, etc. is adopted for the reflection sheet 4.

Illuminating light is introduced into the guide plate 2 through the incidence surface 2A and is propagated toward a distal end of the guide plate 2 while this illuminating light is repeatedly reflected between two major surfaces (a back surface 2B and an emission surface 2C). In the meantime, illuminating light is subjected to scattering action by the fine particles within the guide plate 2. Irregular reflecting action of illuminating light occurs when the reflection sheet 4 made of an irregular reflection member is adopted.

Incident angle of illuminating light to the emission surface 2C is reduced stepwise after every reflection on the inclined back surface 2B. The reduction in the incident angle causes an increase in light components having an angle equal to or smaller than critical angle with respect to the emission surface, and promotes light emission from the emission surface. Thus, deficiency of the emitted light in an area far from the primary light source 3 is prevented.

Illuminating light emitted from the emission surface 2C has a property of scattering light since this illuminating light is scattered by fine particles within the light scattering guide plate 2 or is further irregularly reflected on the reflection sheet 4. However, a main propagating direction of illuminating light from the emission surface 2C is inclined in a distal direction (a direction in which illuminating light goes away from the incidence surface 2A) with respect to a frontal direction on a surface parallel to the incidence surface 2A. Namely, the emitted light of the scattering guide plate 2 has directivity. Such property is called directivity emitting property.

The propagating direction of illuminating light from the emission surface 2C is symmetrically spread on both sides with respect to the frontal direction on a plane perpendicular to the incidence surface 2A. Namely, light components emitted in left-hand and right-hand slanting directions are included in illuminating light as seen from the incidence surface 2A.

The prism sheet 5 arranged along the emission surface 2C is made of a transmissive sheet member such as polycarbonate, etc. The prism sheet 5 has a prism surface on which many parallel prism rows are formed. In this example, the prism sheet 5 is oriented so that a prism surface is directed to the guide plate 2 and the prism rows approximately extend in parallel with the incidence surface 2A.

For example, each of the prism rows is made of fine projection rows having a triangular shape in cross section. Slopes of these projections correct the obliquely emitted illuminating light in a frontal direction on a surface perpendicular to the incidence surface 2A. A so-called double-sided prism sheet having prism surfaces on both sides thereof may be used. In this case, the prism rows on an outside prism surface run in a direction approximately perpendicular to the prism rows on an inside prism surface. The outside prism surface corrects illuminating light in the frontal direction on a surface parallel to the incidence surface 2A.

In the above surface light source device 1 of side light type, it is supposed that utilization efficiency of illuminating light can be improved by integrating the prism sheet 5 and the scattering guide plate 2.

However, when the prism sheet 5 and the light scattering guide plate 2 are practically integrated, a reduction in luminance level is observed along both sides from a portion near the incidence surface as shown by an arrow B in FIG. 11. This reduction is not desirable since it reduces quality of illuminating light.

OBJECT AND SUMMARY OF INVENTION

The present invention is made under the above background and provides a surface light source device of side light type having high utilization efficiency of illuminating light and capable of emitting illuminating light of high quality.

A surface light source device of side light type according to the present invention has a guide plate having two major surfaces for providing an emission surface and a back surface, and a primary light source for supplying illuminating light from an end surface of said guide plate. At least one of the two major surfaces provides a light control surface having projections repeatedly arranged and running in a direction approximately perpendicular to the end surface receiving the supplied light. Each of these projections includes a slope-couple connecting a pair of slopes. Dullness varying in accordance with position on the emission surface is given to the slope-couple so as to uniform emitting intensity from the emission surface.

In accordance with an aspect of a change in dullness given to the slope-couple, dullness is given to the slope-couple in the vicinity of the incidence surface in a tendency to an increase in dullness in accordance with approaches to left-hand and right-hand side portions. In accordance with another mode, dullness is given to the slope-couple in a tendency to an increase in dullness in accordance with an approach to said incidence surface from a distal end of the guide plate. These modes may be applied in combination with each other.

Further, a light control member for correcting directivity of illuminating light emitted from the emission surface on a plane perpendicular to the incidence surface may be arranged along the emission surface of the guide plate.

The present invention will next be explained further in detail with reference to the accompanying drawings.

EMBODIMENTS

(1) First Embodiment

Figure 2:
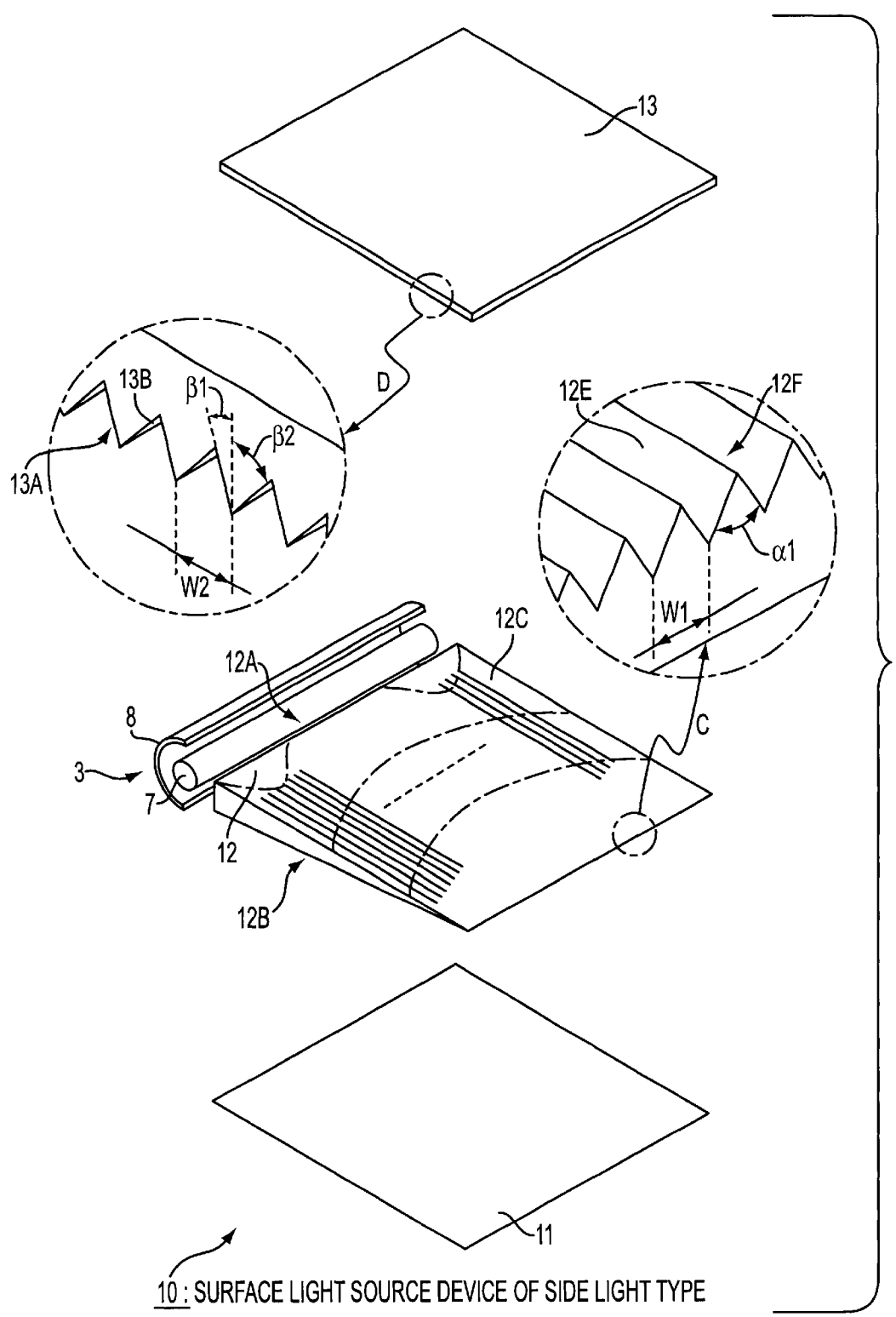
FIG. 2 is an exploded perspective view showing the surface light source device of side light type in the first embodiment of the present invention.

With reference to FIG. 2, a surface light source device 10 of side light type has a scattering guide plate 12, a primary light source 3, a reflection sheet 11 and a prism sheet 13 serving as a light control member. The reflection sheet 11, the scattering guide plate 12 and the prism sheet 13 are laminatedly arranged and are fixed by a frame member (not shown).

A regular reflection member evaporating silver thereon is adopted as the reflection sheet 11 such that the regular reflection member shows high reflectivity with respect to illuminating light. The reflection sheet 11 efficiently returns illuminating light leaked from a back surface 12B of the scattering guide plate 12 to the interior of the scattering guide plate 12 so that loss of illuminating light is prevented.

The scattering guide plate 12 is a guide plate made of a scattering guide material. For example, the scattering guide material is made of a matrix formed by PMMA (polymethyl methacrylate) and many transmissive fine particles uniformly dispersed into this matrix. Refractive index of these fine particles is different from that of the matrix.

As enlargedly illustrated partially by an arrow C, an emission surface 12C of the guide plate 12 provides a light control surface. This light control surface has many fine projections extending perpendicularly to an incidence surface 12A. Each of the projections has a shape for connecting a pair of slopes 12E, 12F. The pair of slopes 12E, 12F have an equal angle with respect to a normal line rising on a general surface of the guide plate 12. For example, a vertical angle $\alpha 1$ of these slopes is set to be equal to about 60 degrees. In general, the vertical angle $\alpha 1$ practically ranges from 50 degrees to 130 degrees and preferably ranges from 60 degrees to 110 degrees.

It is preferable that repeating pitch W1 of the fine projections is set to be equal to or smaller than 100 μm and is particularly set to be equal to or smaller than 50 μm. This pitch value corresponds to a length (equal to or smaller than 100 μm) not more than a length half a pixel period of a liquid crystal display panel back-lightened by the surface light source device 10 of side light type, or a length (equal to or smaller than 50 μm) not more than one fourth of this pixel period. Such a small pitch W1 prevents moire stripes and fine periodic luminance irregularities from being caused.

As enlargedly illustrated partially by an arrow D, the prism sheet 13 has a prism surface as a light control surface opposed to the guide plate 12. For example, this prism surface is formed by curing acrylic ultraviolet hardening resin, etc. in a predetermined shape on a base made of transparent PET.

Each of the fine projections on the prism surface runs in a direction approximately parallel to the incidence surface 12A. Slopes 13A, 13B constituting each of the fine projections on the prism surface form angles $\beta 1$ and $\beta 2$ with respect to the normal line rising on the general surface of the scattering guide plate 12. Angle $\beta 1$ is smaller than angle $\beta 2$. The slope 13A is relatively near the incidence surface 12A and the slope 13B is relatively far from the incidence surface 12A.

The inclination angles β1 and β2 are determined such that (i) main illuminating light obliquely emitted from the emission surface 12C is incident to the slope 13A at a small incident angle and is guided to the slope 13B efficiently, and (ii) this main illuminating light is further totally reflected on the slope 13B and is approximately directed in the frontal direction.

In general, illuminating light emitted from the emission surface 12C is mainly emitted in a direction inclined about 70 degrees in a wedge distal end direction from a vertical direction. This illuminating light is angularly spread in a range from about 20 degrees to 85 degrees from the vertical direction.

In consideration of these, the angles β1, β2 and the refractive index of the prism sheet 13 are designed such that light is sufficiently emitted approximately in the frontal direction from the prism sheet 13. One preferable combination of these values is β1=5.5 degrees and β2=35 degrees.

Similar to W1, it is preferable that repeating pitch W2 of the fine projections on the prism sheet 13 is set to be equal to or smaller than 100 μm and is particularly set to be equal to or smaller than 50 μm. This value corresponds to a length (equal to or smaller than 100 μm) not more than a length half a pixel period of a liquid crystal display panel backlightened by the surface light source device 10 of side light type, or a length (equal to or smaller than 50 μm) not more than one fourth of this pixel period. Such a small pitch W2 prevents moire stripes and fine periodic luminance irregularities from being caused. Further, sticking of the prism sheet to the scattering guide plate 12 is effectively avoided.

Illuminating light emitted from the fluorescent lamp 7 is directly introduced from the incidence surface 12A into the guide plate 12. Otherwise, after illuminating light is reflected on a reflector 8, this illuminating light is introduced from the incidence surface 12A into the guide plate 12. Illuminating light is repeatedly reflected between the back surface 12B and the emission surface 12C and is propagated within the guide plate 12 while illuminating light is scattered by transparent fine particles.

Incident angle of illuminating light to the emission surface 12C is reduced after every reflection on the back surface 12B. Light components having an angle equal to or smaller than a critical angle with respect to the emission surface 12C are emitted from the emission surface 12C. Illuminating light leaked from the back surface 12B is efficiently returned into the guide plate 12 by the reflection sheet 11 so that loss of illuminating light is prevented.

In addition to the above basic structure and function, most important features of the present invention are given to a control surface provided by the emission surface 12C. These features will next be explained further referring to FIG. 1. As mentioned above, each of the projections has a shape in which a pair of slopes 12E, 12F are connected to each other. Here, it is important that dullness of slope-couples are different in accordance with position on the emission surface 12C. The difference in dullness of the slope-couples is given so as to uniform emitting intensity (luminance) of light from the emission surface 12C. The difference in dullness of the slope-couples can be realized through design of inner profile of a mold used to mold the scattering guide plate 12.

The difference in dullness of the slope-couples in this embodiment is given by the following tendencies.

Tendency 1; Dullness of the slope-couples is increasing and curvature radius of a curved surface connecting the slopes 12E, 12F is rising in the vicinity of the incidence surface 12A in accordance with an approach to left-hand and right-hand side portions.

Tendency 2; Dullness of the slope-couples is increasing and the curvature radius of a curved surface connecting the slopes 12E, 12F is rising in accordance with an approach to the incidence surface 12A from a wedge distal end.

Needless to say, actions of the slopes 12E, 12F are to correct illuminating light obliquely emitted and spread leftward and rightward on a plane parallel to the incidence surface 12A to the frontal direction.

Figure 3:
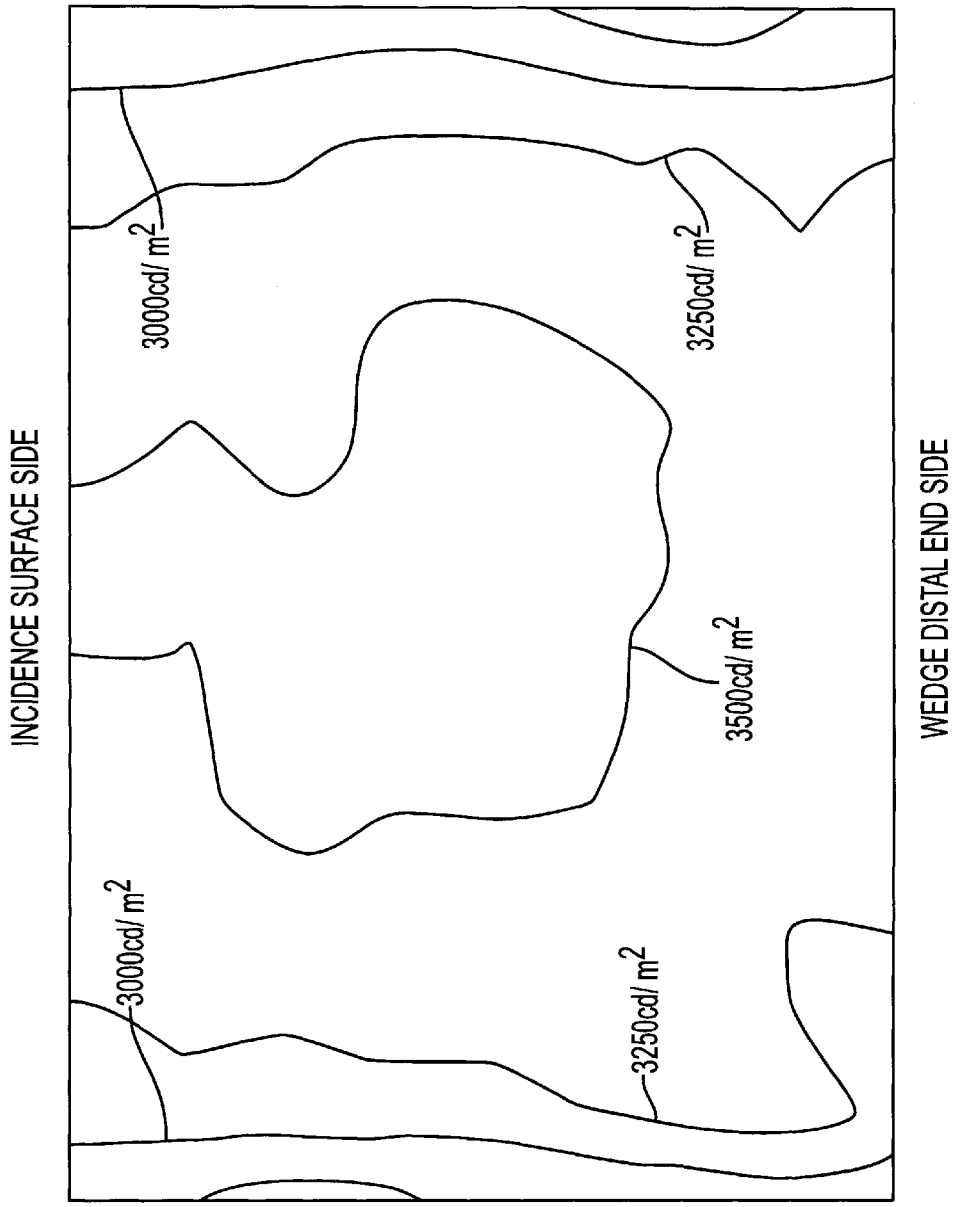
FIG. 3 is a view showing a luminance distribution in a conventional surface light source device of side light type for reference.
Figure 12:
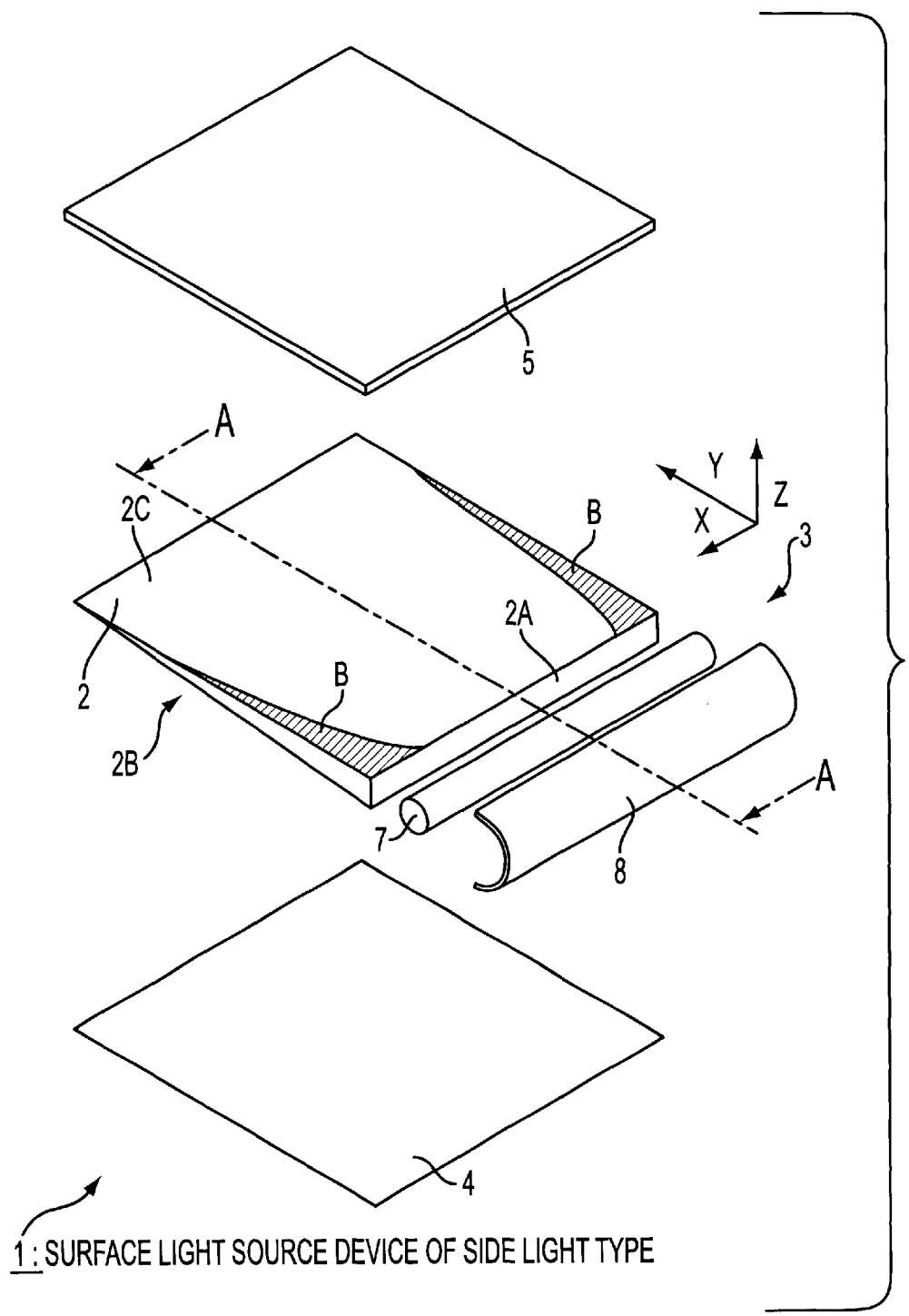
FIG. 12 is an exploded perspective view showing a conventional surface light source device of side light type.
Figure 13:
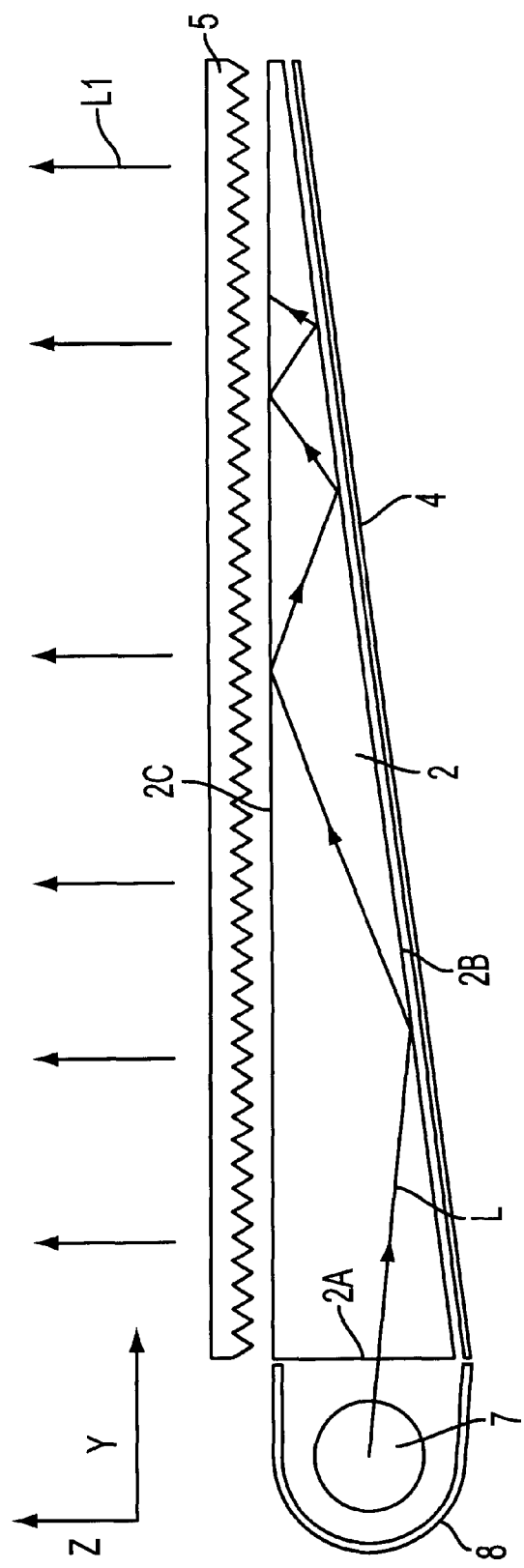
FIG. 13 is a cross-sectional view taken along line A—A in FIG. 12.

FIG. 3 shows measured results of a luminance distribution (an emitting intensity distribution; the same hereinafter) in the conventional surface light source device of side light type for reference shown in FIG. 12. As can be seen from FIG. 3, luminance level is high in a central portion of the luminance distribution and the luminance distribution has a peak luminance of 3578 cd/m². In contrast to this, FIG. 4 shows an intensity distribution of the emitted light measured with respect to a structure in which the difference in dullness of the slope-couple is removed and all the slopes 12E, 12F as slope pairs are directly connected to each other in this embodiment (FIG. 2).

Figure 4:
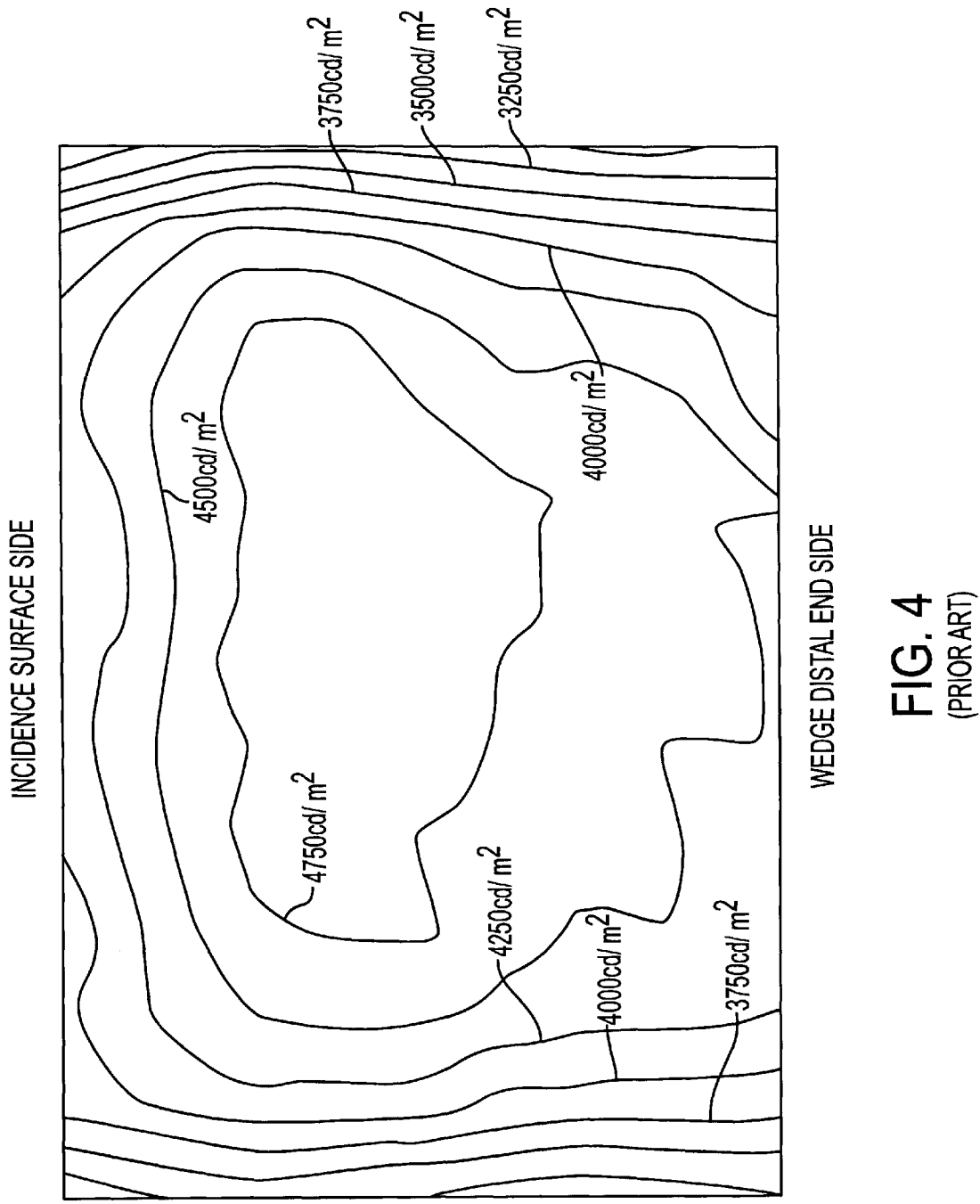
FIG. 4 is a view showing a luminance distribution in one case in which a prism surface (having no light diffusive property) is formed on an entire emission surface.

As can be seen from FIG. 4, the luminance level is high in a central portion of the luminance distribution and the luminance distribution has a peak luminance reaching 4980 cd/m². Namely, a bright surface light source device is obtained in comparison with FIG. 3. However, in the case of FIG. 4, the difference in luminance height is great and a darkest bottom luminance is 2654 cd/m². A low luminance area tends to notably appear in side portions (corner portions) near the incidence surface.

This is because it is considered that less illuminating light propagated within the scattering guide plate 12 is propagated on both sides by the prism surface formed on the emission surface 12C. Namely, the projections in a ridge shape extending perpendicularly to the incidence surface 12A strongly guide illuminating light toward a wedge distal end in comparison with a case in which no prism surface is formed on the emission surface. As a result, a light amount distributed to left-hand and right-hand side portions is reduced so that a great difference in luminance level is caused between these side portions and a central portion.

In contrast to this, in this embodiment, the slopes 12E, 12F are connected to each other by a curved surface. Illuminating light can be distributed on both the sides in accordance with dullness of the projections determined by a size of this curved surface. Luminance is preferably uniformed if the projections are formed near the incidence surface in consideration of a tendency of the low luminance area appearing in a corner portion near the incidence surface such that dullness of slope-couples is increasing in accordance with approaches to both the side portions. Further, reduction in luminance is prevented near the wedge distal end if the projections are formed such that dullness of slope-couples is sequentially increasing in accordance with an approach to the incidence surface from the wedge distal end.

Figure 5:
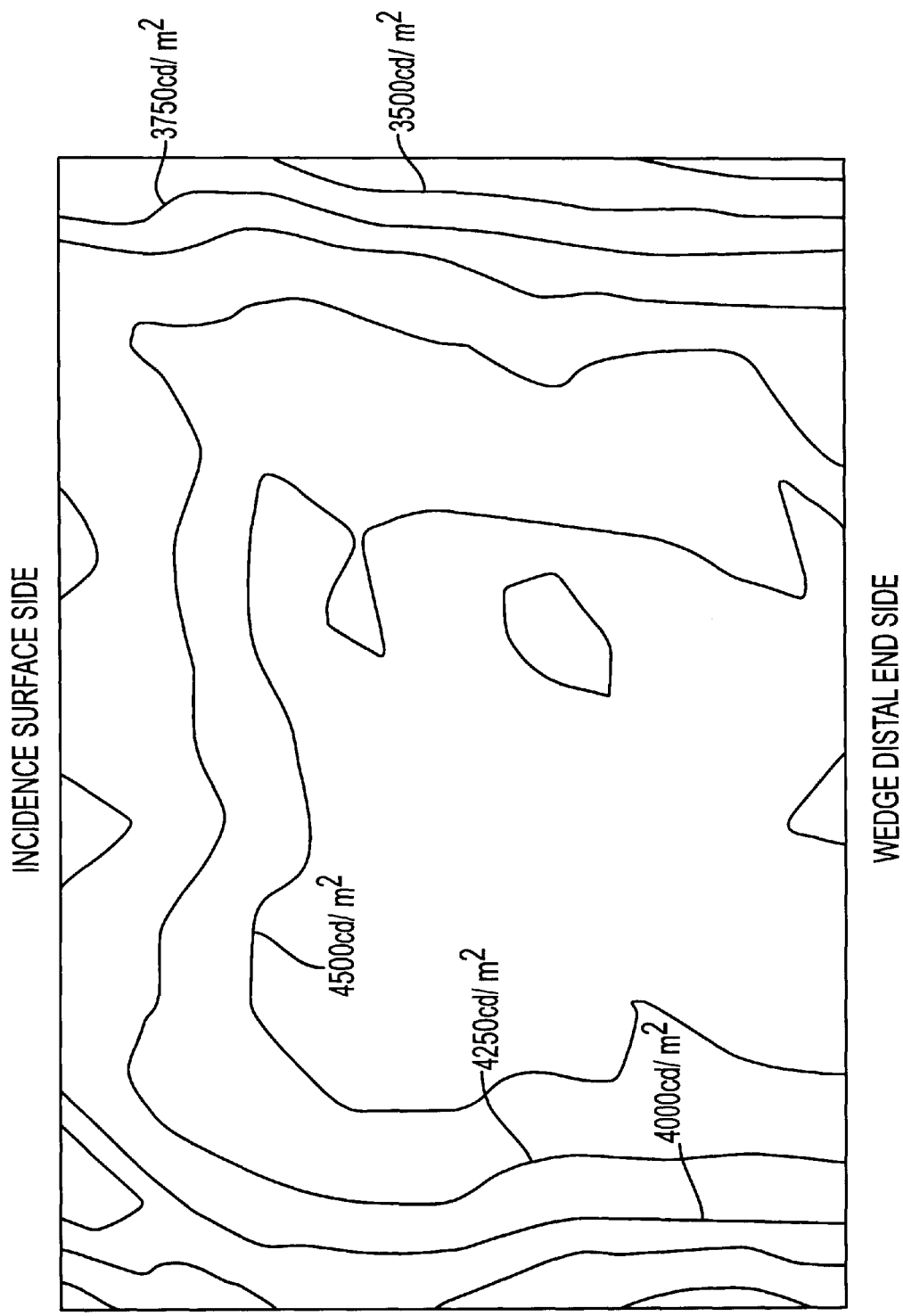
FIG. 5 is showing a luminance distribution in the surface light source device of side light type shown in FIG. 1.

FIG. 5 shows the measured results of a luminance distribution in the surface light source device 10 of side light type (FIGS. 1 and 2) in this embodiment. The above action is reflected into FIG. 5. When FIG. 5 is compared with FIG. 4, it should be understood that uniformity of the luminance is achieved and illuminating light of high quality is obtained. In this FIG. 5, maximum and minimum values of the luminance level are respectively 4677 cd/m² and 3133 cd/m².

Thus, illuminating light emitted uniformly and obliquely from the emission surface 12C is subsequently transmitted through the prism sheet 13 and is directed in the frontal direction on a plane perpendicular to the incidence surface 12A and illuminates e.g., an unillustrated liquid crystal panel.

As mentioned above, in accordance with this embodiment, dullness in connection of the slope pairs constituting the projections is varying in accordance with position on the emission surface with respect to the light control surface (prism surface) provided by the emission surface of the scattering guide plate. This change is characterized by the above tendencies 1 and 2 so that uniformity of illuminating light is improved.

(2) Second Embodiment

Figure 6:
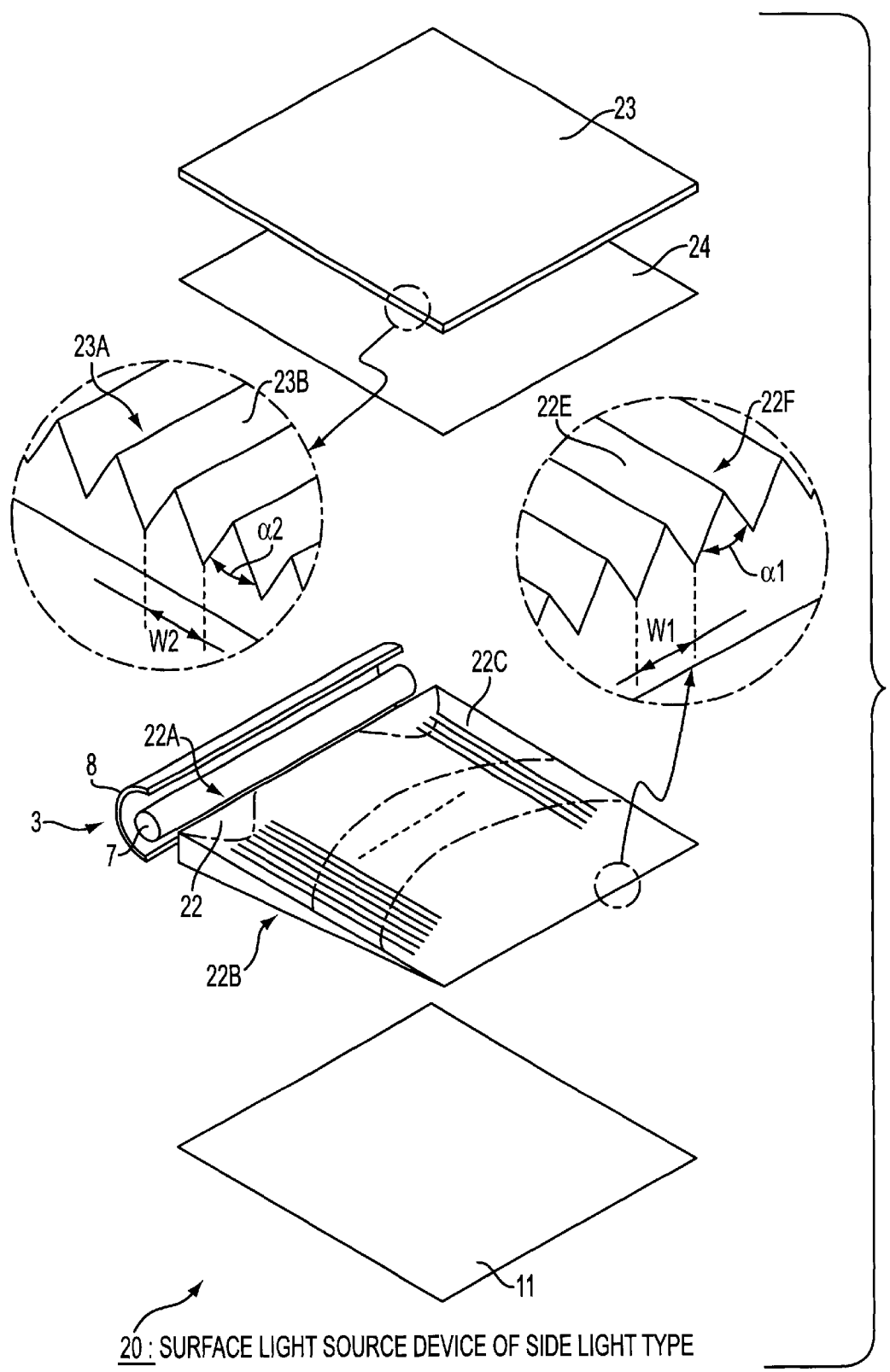
FIG. 6 is an exploded perspective view showing a surface light source device of side light type in a second embodiment of the present invention.

FIG. 6 is an exploded perspective view showing a surface light source device of side light type in accordance with a second embodiment of the present invention in a drawing method similar to that of FIG. 2. Explanation of matters common to the surface light source device 10 of side light type in FIG. 2 is simplified in the following description.

The surface light source device 20 of side light type has a guide plate 22, a primary light source 3, a reflection sheet 11, a light diffusive sheet 24 and a prism sheet 23. The reflection sheet 11, the guide plate 22, the light diffusive sheet 24 and the prism sheet 23 are sequentially laminatedly arranged. For example, the guide plate 22 is made of a transparent member obtained by injecting acrylic (PMMA resin). A sectional shape of the guide plate 22 is of a wedge type and the guide plate 22 has two major surfaces (an emission surface 22C and a back surface 22B). Light diffusive ink is applied to the back surface 22B so that a light diffusive surface is formed.

Illuminating light propagated within the guide plate 22 is repeatedly reflected between the back surface 22B and the emission surface 22C while this illuminating light is scattered by the back surface 22B. In these reflections, light components having an angle equal to or smaller than critical angle are emitted from the back surface 22B and the emission surface 22C.

As enlargedly illustrated partially in FIG. 6, a surface (outside surface) of the prism sheet 23 turning its back on the emission surface 22C provides a prism surface as a light control surface. This prism surface has many fine projections approximately extending in parallel with the incidence surface 22A. The projections on the prism sheet 23 run in a direction perpendicular to projections on the guide plate 22.

Each of the projections on the prism sheet 23 has a pair of slopes 23A, 23B. In this embodiment, the pair of slopes 23A, 23B are directly connected to each other so that each of these projections has a triangular shape in cross section.

Illuminating light obliquely emitted from the emission surface 22C in the direction of a wedge distal end is internally guided from a smooth surface (an inside surface facing to the emission surface 22C) of the prism sheet 23, and is directed to a frontal direction of the emission surface 22C by refraction action of the slopes 23A and 23B. Accordingly, the prism sheet 23 corrects directivity of the emitted light to the frontal direction of the emission surface 22C on a plane perpendicular to the incidence surface 22A.

In this embodiment, the pair of slopes 23A, 23B has an equal angle with respect to a normal line rising on a general surface of the guide plate. For example, a vertical angle $\alpha 2$ is set to be equal to about 90°. In general, the vertical angle $\alpha 2$ practically ranges from 30 degrees to 130 degrees and preferably ranges from 60 degrees to 110 degrees and particularly preferably ranges from 80 degrees to 100 degrees.

Here, it is important that dullness of slope-couples is different in accordance with position on the emission surface 22C. The difference in dullness of the slope-couples is given so as to produce a uniform emitting intensity (luminance) of light from the emission surface 22C. The difference in dullness of the slope-couples can be realized through design of inner profile of a mold used to mold the guide plate 22.

Similarly to the first embodiment, the difference in dullness of the slope-couples is given by the following tendencies.

Tendency 1; Dullness of the slope-couples is increasing and curvature radius of a curved surface connecting slopes 22E, 22F is rising in the vicinity of the incidence surface 22A in accordance with approaches to left-hand and right-hand side portions.

Tendency 2; Dullness of the slope-couples is increasing and curvature radius of a curved surface connecting slopes 22E, 22F is rising in accordance with an approach to the incidence surface 22A from a wedge distal end.

Needless to say, actions of the slopes 22E, 22F are to correct illuminating light obliquely emitted and spread leftward and rightward on a plane parallel to the incidence surface 22A to the frontal direction.

Figure 7:
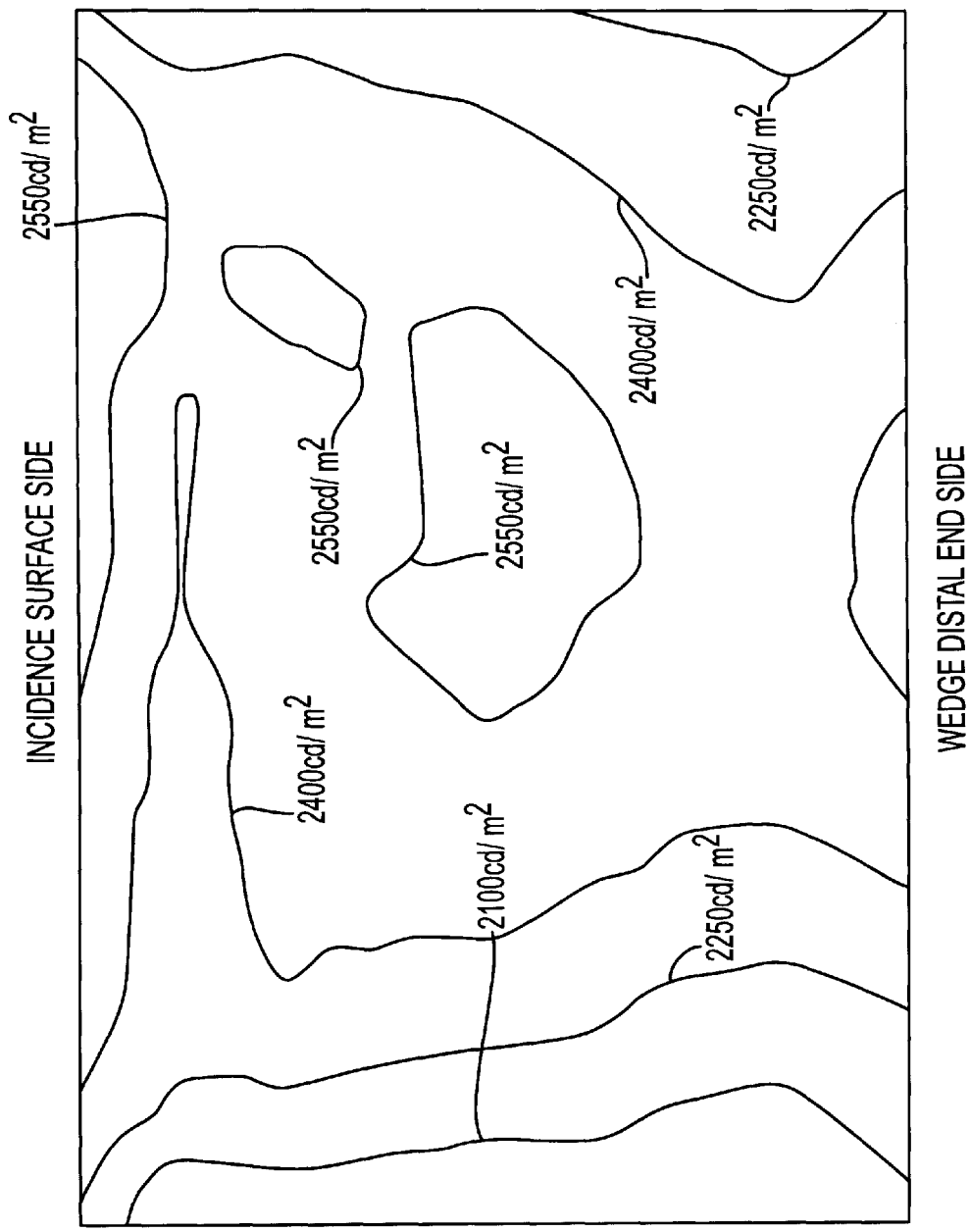
FIG. 7 is showing a luminance distribution in another conventional surface light source device of side light type for reference.

FIG. 7 shows measured results of luminance distribution in the surface light source device of side light type of a conventional structure for reference in which a light diffusive sheet and a prism sheet are laminated on a guide plate having a flat emission surface (having no prism surface). The prism sheet is arranged such that a prism surface is directed upward and repeating direction of projections is perpendicular to an incidence surface.

Luminance level is with the maximum and minimum luminance values being respectively, 2702 cd/m$^2$ and 2393 cd/m$^2$.

Figure 8:
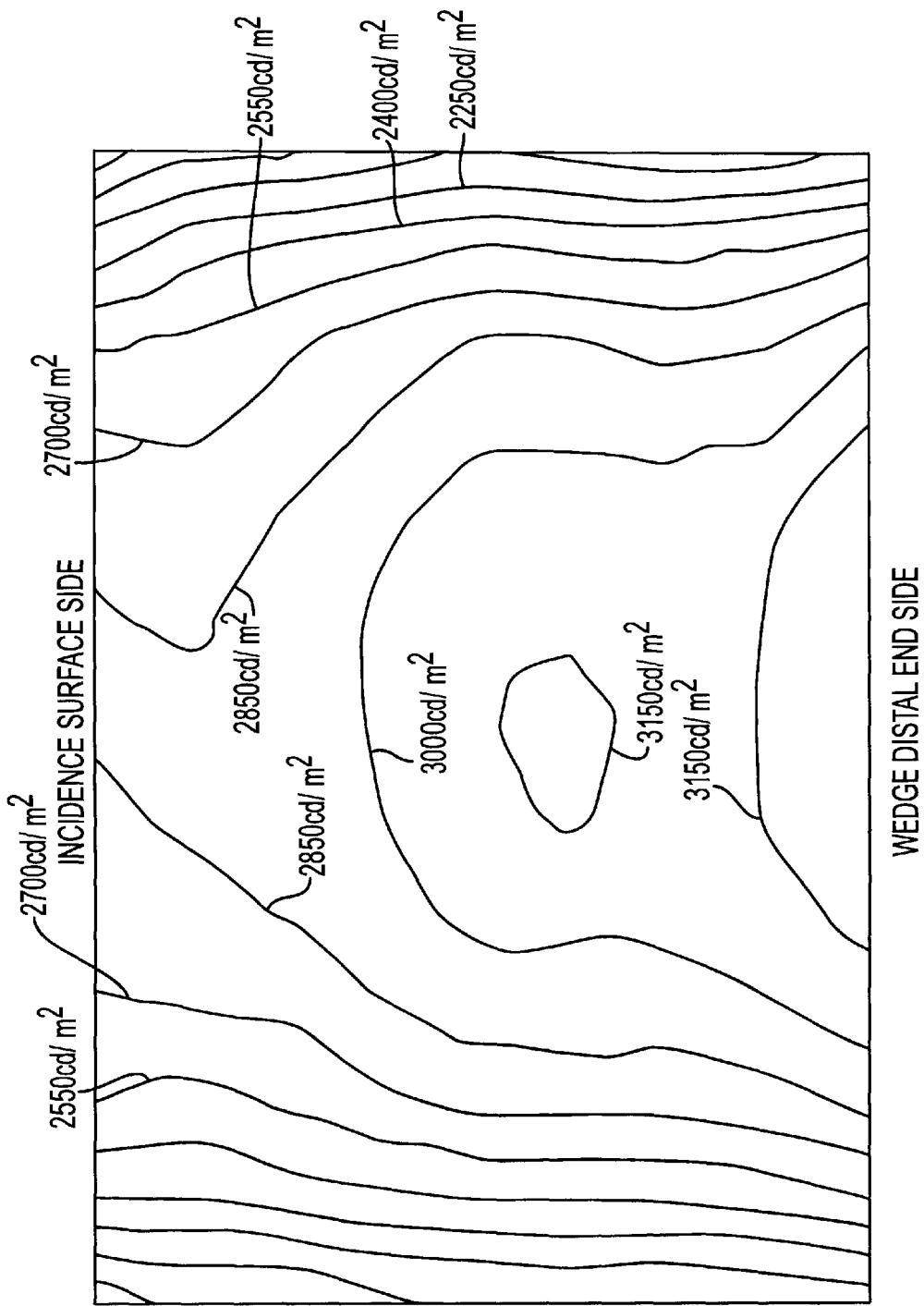
FIG. 8 is showing a luminance distribution in another case in which a prism surface (having no light diffusive property) is formed on an entire emission surface.

FIG. 8 shows an intensity distribution of the emitted light measured with respect to a structure in which the difference in dullness of the slope-couples is removed and all the slopes 22E, 22F as slope pairs are directly connected to each other in this embodiment (FIG. 6).

As can be seen from FIG. 8, a maximum luminance is raised and a peak luminance is 3310 cd/m$^2$. However, a minimum luminance is 1690 cd/m$^2$ which is low. Namely, the difference in luminance is large and luminance suddenly drops toward side portions and this tendency is particularly striking in accordance with an approach to the incidence surface.

Causes of such a phenomenon have been explained in association with FIGS. 3 and 4. Namely, it is considered that less illuminating light propagated within the guide plate 22 is propagated on both sides by the prism surface formed on the emission surface 22C. Namely, the projections in a ridge shape extending perpendicularly to the incidence surface 22A strongly guide illuminating light toward a wedge distal end in comparison with a case in which no prism surface is formed on the emission surface. As a result, light amount distributed to left-hand and right-hand side portions is reduced so that a great difference in luminance level is caused between these side portions and a central portion.

In contrast to this, in this embodiment, the slopes 22E, 22F are connected to each other by a curved surface. Illuminating light can be distributed on both the left-hand and right-hand sides in accordance with dullness of the projections determined by a size of this curved surface. Luminance is preferably uniformed if the projections are formed near the incidence surface in consideration of the tendency of a low luminance area appearing in corner portions near the incidence surface such that dullness of the slope-couples is increasing in accordance with approaches to both the side portions.

Further, reduction in luminance is prevented near a wedge distal end if the projections are formed such that dullness of the slope-couple is sequentially increasing in accordance with an approach to the incidence surface from the wedge distal end.

Figure 9:
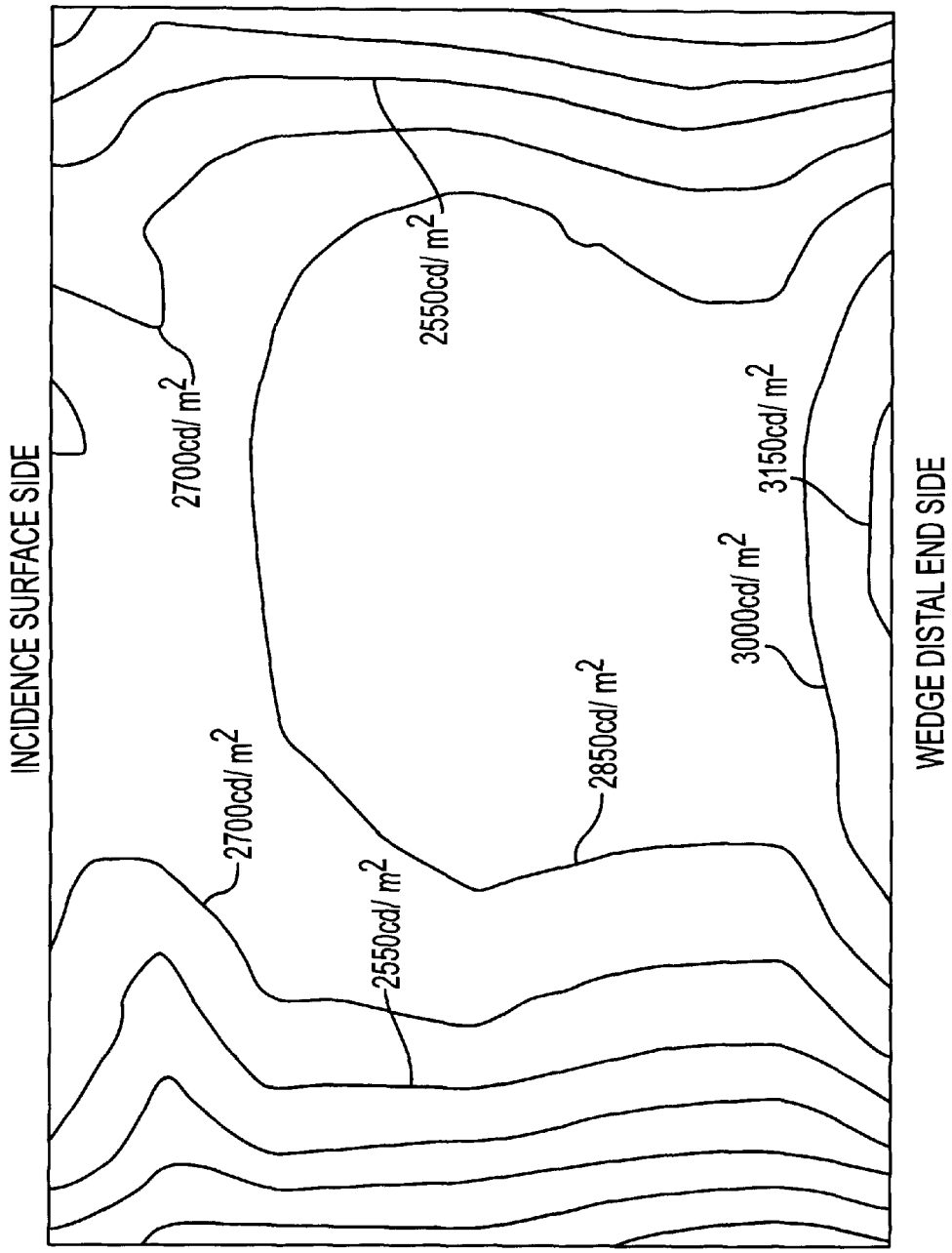
FIG. 9 is showing a luminance distribution in the surface light source device of side light tpye shown in FIG. 6.

FIG. 9 shows measured results of a luminance distribution in the surface light source device 20 of side light type (FIG. 6) in this embodiment. The above action is reflected into FIG. 8. When FIG. 9 is compared with FIG. 8, it should be understood that uniformity of the luminance is achieved and illuminating light of high quality is obtained. In this FIG. 9, maximum and minimum values of the luminance level are respectively 3182 cd/m$^2$ and 1847 cd/m$^2$.

Thus, illuminating light emitted uniformly and obliquely from the emission surface 22C is gently diffused by the light diffusive sheet 24 and is then transmitted through the prism sheet 23. Illuminating light directed in a frontal direction on a surface perpendicular to the incidence surface 22A illuminates e.g., an unillustrated liquid crystal panel.

As mentioned above, in this embodiment, dullness in connection of the slope pairs constituting the projections is also varying in accordance with position on the emission surface with respect to a light control surface (prism surface) provided by the emission surface of the guide plate. This change is characterized by the above tendencies 1 and 2 so that uniformity of illuminating light is improved.

(3) Other Embodiments

The present invention is not limited to the first and second embodiments explained above. For example, the first and second embodiments can be modified as follows.

(a) In the above embodiments, a connecting portion of each pair of flat slopes of the projections provides a curved surface and dullness of the slope-couples is adjusted by varying curvature of this curved surface. However, the present invention is not limited to this construction. Inclinations of the pair of flat slopes themselves may be varying. Further, the entire slopes may be formed in the shape of a curved surface and a change in shape of the curved surface may be given.

(b) In the above embodiments, dullness is increased near the incidence surface in accordance with approaches to sides and is also increased in accordance with an approach to the incidence surface from a distal end of the guide plate. However, the present invention is not limited to this construction, but various dullness variations for uniforming luminance can be adopted.

For example, when length of the guide plate (distance between the incidence surface and the distal end) is short, luminance can be made uniform by forming the projections such that dullness is simply increased in accordance with an approach to a side.

Further, when width of the guide plate (length along the incidence surface) is short or a light source is sufficiently long (rather longer than the length along the incidence surface), luminance may be uniformed by simply increasing dullness in accordance with an approach to the incidence surface from the distal end of the guide plate.

Figure 10:
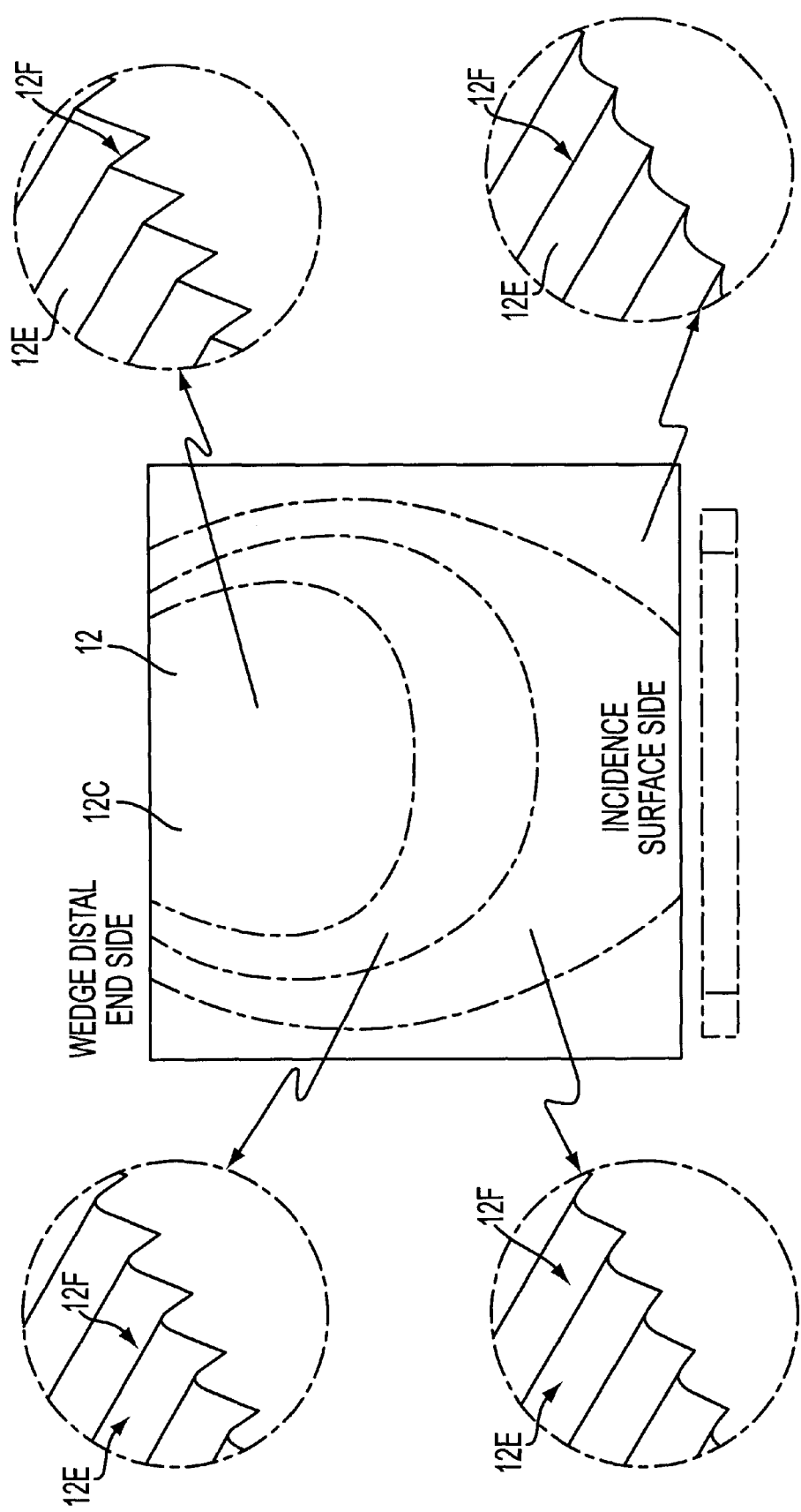
FIG. 10 is a plan view showing an emission surface of a scattering guide plate adopted in a surface light source device of side light type in accordance with still another embodiment.

FIG. 10 shows still another example. As shown in this figure, slope-couple of projections are smoothly formed along a side of the guide plate. Dullness of the slope-couples of the projections are further raised in a corner portion of the guide plate on its distal end side so that luminance can be also uniformed.

(c) There is no limit in a method for obtaining the guide plate or the scattering guide plate having a variation in dullness of the slope-couple of the projections. For example, dullness of the projections can be given in accordance with position on the emission surface by controlling transfer characteristics of shapes by setting a molding condition in molding processing without machining of a mold.

Figure 11:
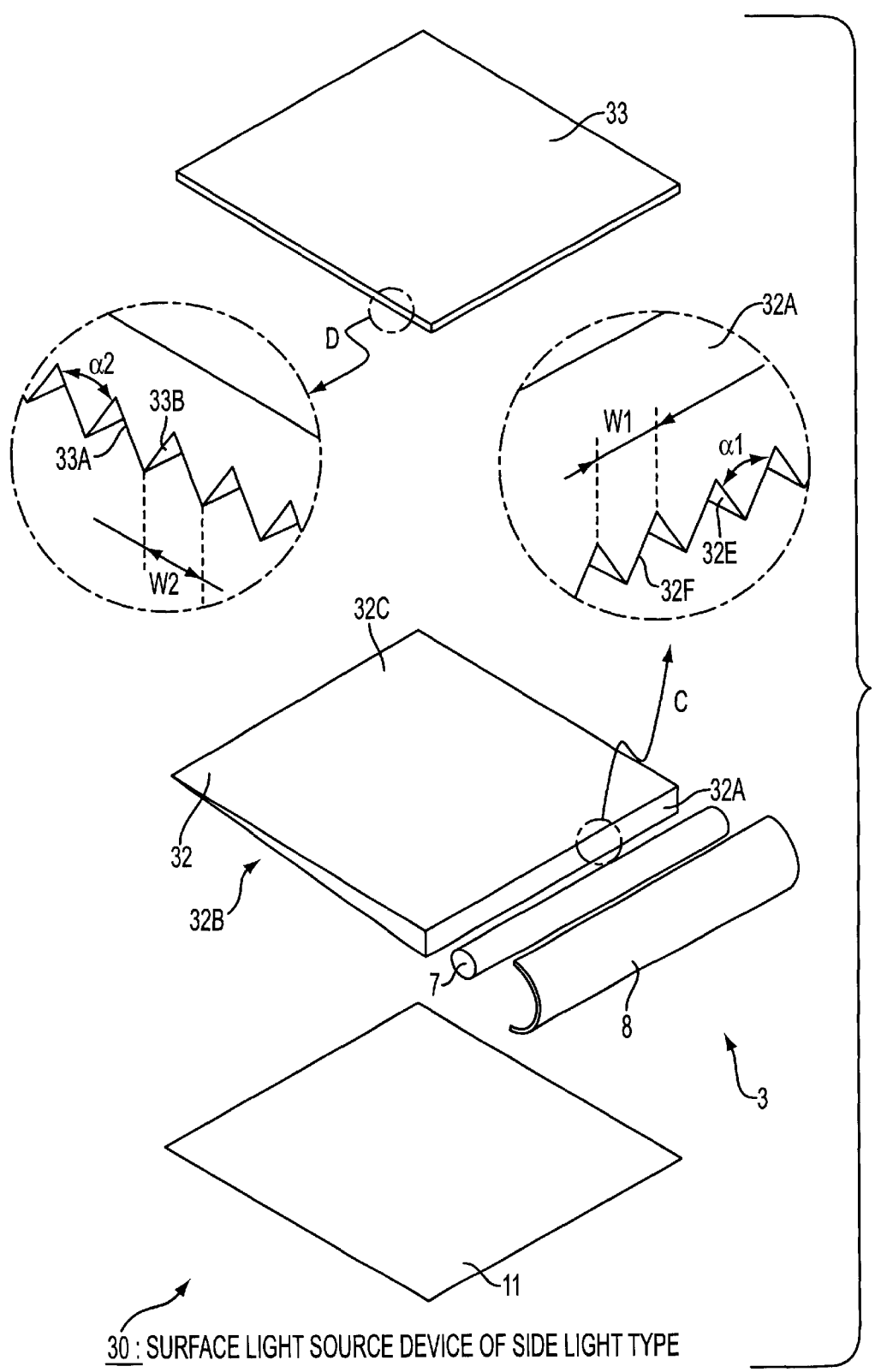
FIG. 11 is an exploded perspective view showing a surface light source device of side light type in still another embodiment in which a prism surface is formed on the back surface of a guide plate.

(d) In the above embodiments, a major surface forming the prism surface as a light control surface is an emission surface. However, the present invention is not limited to this case. Namely, the prism surface as a light control surface may be also formed on a back surface of the guide plate. FIG. 11 is an exploded perspective view in which a surface light source device of side light type in an embodiment having the prism surface on the back surface of the guide plate is shown in a drawing method similar to that of FIG. 2. Matters common to the surface light source device 10 of side light type in FIG. 2 are simply explained in the following description.

The surface light source device 30 of side light type has a scattering guide plate 32, a primary light source 3, a reflection sheet 11 and a prism sheet 33. A guide plate made of a transparent member may be adopted instead of the scattering guide plate 32. The scattering guide plate 32 has a wedge-shaped cross section and two major surfaces (an emission surface 32C and a back surface 32B). As enlargedly illustrated partially by an arrow C, the back surface 32B provides a light control surface.

This light control surface has many fine projections extending perpendicularly to an incidence surface 32A. Further, the prism sheet 33 has a structure and an orientation similar to those of the prism sheet 13 in the first embodiment. Namely, as enlargedly illustrated partially by an arrow D, the light control surface is directed to the emission surface 32C of the scattering guide plate 32 and has many projections running in a direction perpendicular to the projections on the back surface 32B.

Inclinations and repeating pitch W1 of a pair of slopes 32E, 32F constituting each of the projections on the back surface of the scattering guide plate 32 may be set on the basis similar to that in the first embodiment. Inclinations and repeating pitch W2 of a pair of slopes 33A, 33B constituting each of projections of the prism sheet 33 may be also set on the basis similar to that in the first embodiment.

Figure 1:
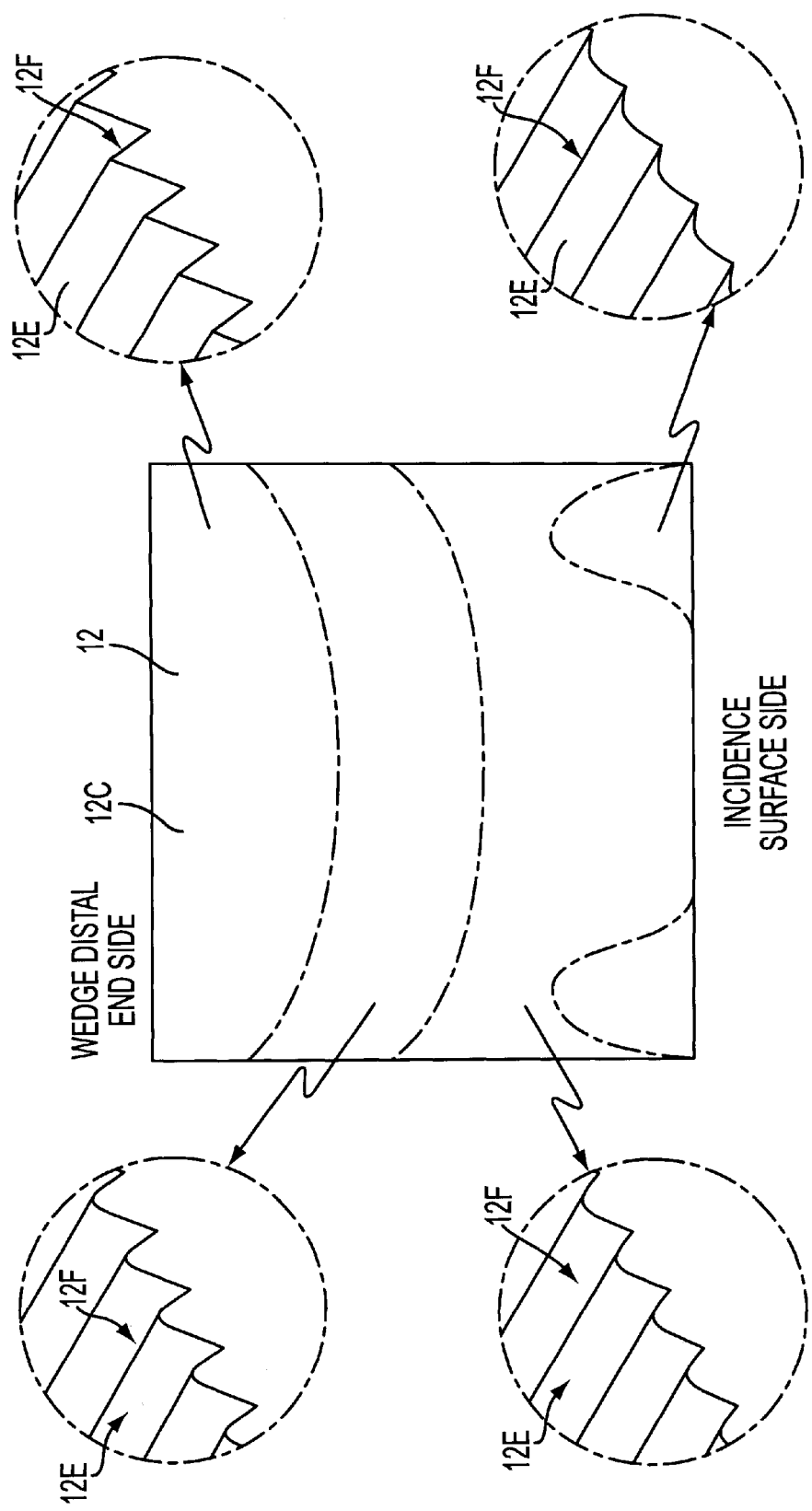
FIG. 1 is a plan view showing an emission surface of a scattering guide plate adopted in a surface light source device of side light type in accordance with a first embodiment of the present invention.

When the prism surface is formed on the back surface of the guide plate (the scattering guide plate or the transparent guide plate), dullness of the projections can be varying by considering FIGS. 1 and 10 as "plan views showing the back surface of the guide plate" as an example. In this case, it should be noted that for reference numerals 12E, 12F read as reference numerals 32E, 32F.

In general, a structure provided with a prism surface on the back surface of the guide plate (the scattering guide plate or the transparent guide plate) has advantages similar to those of a structure provided with a prism surface on the emission surface of the guide plate. Further, when the prism surface of the prism sheet is arranged facing to the emission surface of the guide plate, this prism surface is not facing to the prism surface on the back surface of the guide plate with the result that, damages which would be caused by mutual contact of the prism surfaces are prevented during assembling of the surface light source device, etc.

Prism surfaces (light control surfaces) may be formed on both the emission surface and the back surface in accordance with a combination of the embodiment shown in FIG. 11 and the above first embodiment (or the second embodiment). In this case, variation in dullness of the projections on either one or both of the prism surfaces may be given.

(e) Orientations and shapes of the prism sheet can be variously modified. For example, the prism sheets 13, 23 in the first and second embodiments may be arranged in reverse directions (turned over).

(f) An asymmetrical prism sheet is used in the above first embodiment, and a symmetrical prism sheet is used in the second embodiment. However, the present invention is not limited to the cases. For example, the asymmetrical prism sheet in the first embodiment may be replaced with a symmetrical prism sheet. Further, the symmetrical prism sheet in the second embodiment may be replaced with an asymmetrical prism sheet.

(g) Adoption/inadoption of a light diffusive sheet or its arranging position (inside/outside the prism sheet) may be optionally selected in design.

(h) Not only a sheet material evaporating silver thereon, but also a regular reflection member of an arbitrary material, or an irregular reflection member such as white PET, etc. may be adopted in a reflection member formed along the back surface of the guide plate.

(i) In the above second embodiment, the light diffusive surface is formed by printing of ink. However, the present invention is not limited to this case. For example, the light diffusive surface may be formed on the emission surface or the back surface of the guide plate as a uniform rough surface by mat-surface processing.

Further, the light diffusive surface may be also formed on these surfaces by blast processing with using sand paper and chemical etching processing.

(j) The scattering guide plate containing transmissive fine particles therewith is adopted in the above first embodiment. However, known scattering guide plates of other kinds may be employed.

(k) Incidence surfaces of the guide plate may be set to two end surfaces or more, and plural primary light sources may be correspondingly arranged.

(l) The primary light source may comprise a light source element other than a bar-shaped light source such as a fluorescent lamp. For example, the primary light source may be formed by arranging plural point light sources of a light emitting diode, etc.

(m) Surface light source devices in accordance with the present invention may be applied to uses other than backlighting of a liquid crystal display. For example, they can be widely applied to various kinds of illuminating devices and displays.

What is claimed is:

1. A surface light source device of side light type, comprising:

a guide plate having two major surfaces to provide an emission surface and a back surface, and a primary light source to supply illuminating light from an end surface of said guide plate, wherein at least one of said two major surfaces provides a light control surface having projections repeatedly arranged and running in a direction approximately perpendicular to said end surface, with each of said projections including a slope-couple connecting a pair of slopes with a dullness, defined as degree of roundness of the slope-couple varying in accordance with position on said emission surface, being given to said slope-couple so as to produce a uniform emitting intensity from said emission surface.

2. A surface light source device of side light type, comprising:

a guide plate having two major surfaces to provide an emission surface and a back surface, and a primary light source to supply illuminating light from an end surface of said guide plate, wherein at least one of said two major surfaces provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in the vicinity of the end surface in a tendency to an increase in dullness in accordance with approaches to left-hand and right-hand side portions so as to produce a uniform emitting intensity from said emission surface.

3. A surface light source device of side light type, comprising:

a guide plate having two major surfaces to provide an emission surface and a back surface, and a primary light source to supply illuminating light from an end surface of said guide plate, wherein at least one of said two major surfaces provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in a tendency to an increase in dullness in accordance with an approach to the end surface from a distal end of said guide plate so as to produce a uniform emitting intensity from said emission surface.

4. A surface light source device of side light type, comprising:

a guide plate having two major surfaces to provide an emission surface and a back surface, and a primary light source to supply illuminating light from an end surface of said guide plate, wherein at least one of said two major surfaces provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in the vicinity of the end surface in a tendency to an increase in dullness in accordance with approaches to left-hand and right-hand side portions and also in another tendency to an increase in dullness in accordance with an approach to the end surface from a distal end of said guide plate so as to produce a uniform emitting intensity from said emission surface.

5. A surface light source device of side light type, comprising:

a guide plate having two major surfaces to provide an emission surface and a back surface, and a primary light source to supply illuminating light from an end surface of said guide plate, wherein said emission surface provides a light control surface having projections repeatedly arranged and running in a direction approximately perpendicular to said end surface, with each of said projections including a slope-couple connecting a pair of slopes with a dullness, defined as degree of roundness of the slope-couple varying in accordance with position on said emission surface, being given to said slope-couple so as to produce a uniform emitting intensity from said emission surface.

6. A surface light source device of side light type, comprising:

a guide plate having two major surfaces to provide an emission surface and a back surface, and a primary light source to supply illuminating light from an end surface of said guide plate, wherein said emission surface provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in the vicinity of the end surface in a tendency to an increase in dullness in accordance with approaches to left-hand and right-hand side portions so as to produce a uniform emitting intensity from said emission surface.

7. A surface light source device of side light type, comprising:

a guide plate having two major surfaces to provide an emission surface and a back surface, and a primary light source to supply illuminating light from an end surface of said guide plate, wherein said emission surface provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in a tendency to an increase in dullness in accordance with an approach to the end surface from a distal end of said guide plate so as to produce a uniform emitting intensity from said emission surface.

8. A surface light source device of side light type, comprising:

a guide plate having two major surfaces to provide an emission surface and a back surface, and a primary light source to supply illuminating light from an end surface of said guide plate, wherein said emission surface provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in the vicinity of the end surface in a tendency to an increase in dullness in accordance with approaches to left-hand and right-hand side portions and also in another tendency to an increase in dullness in accordance with an approach to the end surface from a distal end of said guide plate so as to produce a uniform emitting intensity from said emission surface.

9. A surface light source device of side light type, comprising:

a guide plate having two major surfaces to provide an emission surface and a back surface, and a primary light source to supply illuminating light from an end surface of said guide plate, wherein said back surface provides a light control surface having projections repeatedly arranged and running in a direction approximately perpendicular to said end surface, with each of said projections including a slope-couple connecting a pair of slopes with a dullness, defined as degree of roundness of the slope-couple varying in accordance with position on said emission surface, being given to said slope-couple so as to produce a uniform emitting intensity from said emission surface.

10. A surface light source device of side light type, comprising:

a guide plate having two major surfaces to provide an emission surface and a back surface, and a primary light source to supply illuminating light from an end surface of said guide plate, wherein said back surface provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in the vicinity of the end surface in a tendency to an increase in dullness in accordance with approaches to left-hand and right-hand side portions so as to produce a uniform emitting intensity from said emission surface.

11. A surface light source device of side light type, comprising:

a guide plate having two major surfaces to provide an emission surface and a back surface, and a primary light source to supply illuminating light from an end surface of said guide plate, wherein said back surface provides a light control surface having projections repeatedly arranged and running in a direction approximately perpendicular to said end surface, with each of said projections including a slope-couple connecting a pair of slopes with a dullness, defined as degree of roundness of the slope-couple, being given to said slope-couple in a tendency to an increase in dullness in accordance with an approach to the end surface from a distal end of said guide plate so as to produce a uniform emitting intensity from said emission surface.

12. A surface light source device of side light type, comprising:

a guide plate having two major surfaces to provide an emission surface and a back surface, and a primary light source to supply illuminating light from an end surface of said guide plate, wherein said back surface provides a light control surface having projections repeatedly arranged and running in a direction approximately perpendicular to said end surface, with each of said projections including a slope-couple connecting a pair of slopes with a dullness, defined as degree of roundness of the slope-couple, being given to said lope-couple in the vicinity of the end surface in a tendency to an increase in dullness in accordance with approaches to left-hand and right-hand side portions and also in another tendency to an increase in dullness in accordance with an approach to said incidence surface from a distal end of said guide plate so as to produce a uniform emitting intensity from said emission surface.

13. The surface light source device of side light type according to claim 1, 2, 3, 4, 5, 6, 7, 8, 9, 10, 11 or 12, wherein the surface light source device further comprises a light control member arranged along said emission surface to correct directivity of illuminating light emitted from said emission surface in a plane perpendicular to said incidence surface.

* * * * *

UNITED STATES PATENT AND TRADEMARK OFFICE
CERTIFICATE OF CORRECTION

PATENT NO. : 6,280,043 B1  Page 1 of 1
DATED : August 28, 2001
INVENTOR(S) : Shingo Ohkawa It is certified that error appears in the above-identified patent and that said Letters Patent is hereby corrected as shown below:

<u>Title page,</u>
Item [57] ABSTRACT,
Line 10, after "slopes" insert -- so as to --.

Signed and Sealed this

Twenty-sixth Day of February, 2002

Attest:

JAMES E. ROGAN
Attesting Officer   Director of the United States Patent and Trademark Office